United States Patent [19]
Meyer

[11] Patent Number: 5,466,111
[45] Date of Patent: Nov. 14, 1995

[54] WHEELCHAIR AND LIFTING APPARATUS FOR HANDICAPPED PERSONS DRIVING AUTOMOBILES

[76] Inventor: Rudolf X. Meyer, 16966 Livorno Dr., Pacific Palisades, Calif. 90272

[21] Appl. No.: 398,157

[22] Filed: Mar. 3, 1995

[51] Int. Cl.⁶ ..................................................... A61G 3/08
[52] U.S. Cl. ................ 414/462; 280/250.1; 297/DIG. 4; 414/786; 414/921
[58] Field of Search ................................. 280/47.4, 250.1, 280/304.1; 297/DIG. 4; 414/545, 556, 786, 921, 462

[56] References Cited

U.S. PATENT DOCUMENTS

| | | | |
|---|---|---|---|
| 3,865,427 | 2/1975 | Delany | 297/DIG. 4 |
| 4,365,924 | 12/1982 | Brigman et al. | 414/921 X |
| 4,457,663 | 7/1984 | Hems et al. | 297/DIG. 4 |
| 4,483,653 | 11/1984 | Waite | 414/921 X |
| 4,492,403 | 1/1985 | Blomgren et al. | |
| 4,541,511 | 9/1985 | Muller | 414/921 X |
| 4,661,035 | 4/1987 | Danielsson | 414/550 |
| 4,669,943 | 6/1987 | Zamotin | 414/343 |
| 4,688,843 | 8/1987 | Hall | 280/250.1 X |
| 5,207,549 | 5/1993 | Riva | 414/340 |

*Primary Examiner*—Michael S. Huppert
*Assistant Examiner*—Janice L. Krizek
*Attorney, Agent, or Firm*—Small Larkin & Kidde

[57] ABSTRACT

A wheelchair and lifting apparatus and method for loading a wheelchair and its occupant into a desired position in a vehicle, such as the driver's position, by attaching the wheelchair to an open door of the vehicle, utilizing the seat-height adjustment mechanism of the wheelchair that varies the height of the seat of the wheelchair relative to its wheels to lift the wheelchair off the ground and closing the vehicle door so as to position the wheelchair inside the vehicle in an unassisted manner by the occupant, and reversing this sequence of operation for unloading the wheelchair and its occupant from the vehicle.

15 Claims, 2 Drawing Sheets

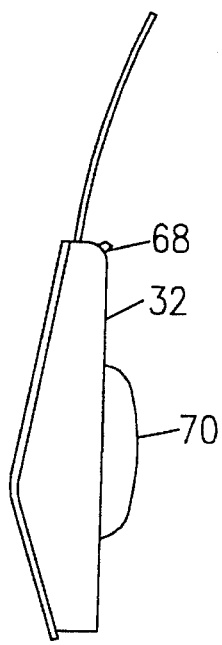
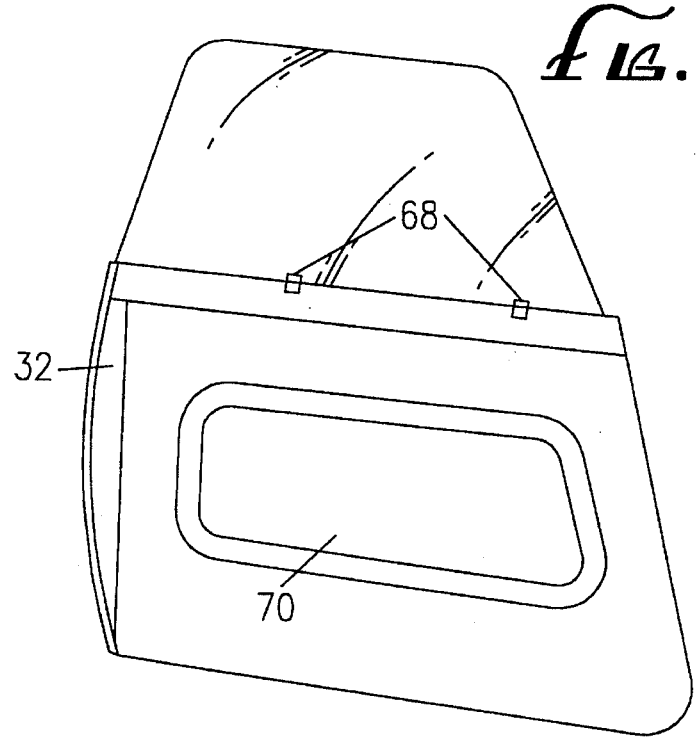
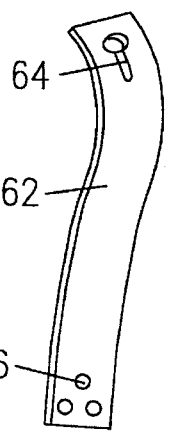
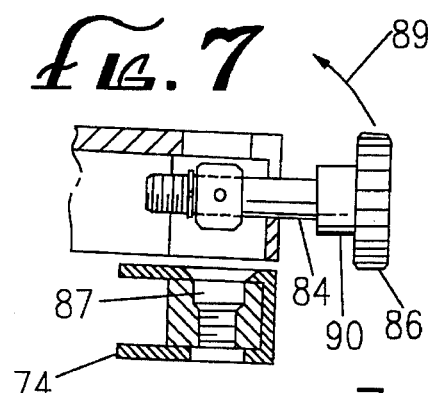
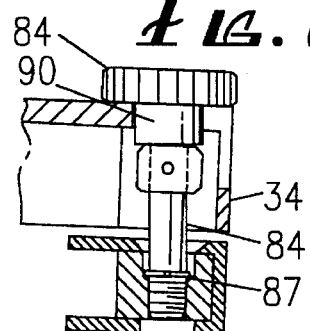
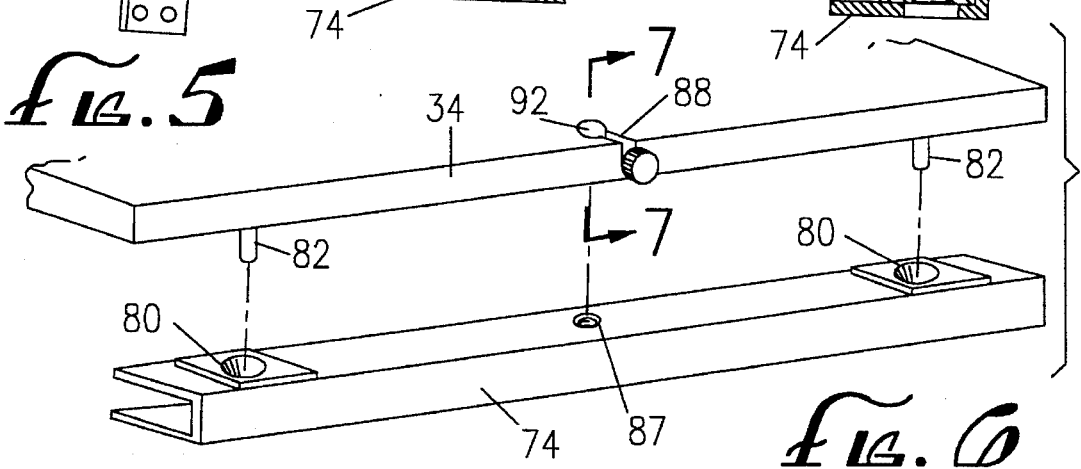

WHEELCHAIR AND LIFTING APPARATUS FOR HANDICAPPED PERSONS DRIVING AUTOMOBILES

BACKGROUND OF THE INVENTION

This invention generally relates to wheelchairs for handicapped or disabled persons. More specifically, the invention relates to wheelchairs and apparatus for lifting them into and out of automobiles while the handicapped persons remain seated thereon during the movement of the wheelchairs.

Handicapped persons, like the rest of the population, desire mobility and the ability to use motor vehicles such as passenger cars, vans, buses and trucks (collectively and generally referred to as "vehicles"). With the ability to drive vehicles, handicapped persons can experience a high degree of mobility and independence. Those handicapped persons who are able to operate wheelchairs usually have the ability to operate vehicles as well, but have great difficulty in entering and exiting vehicles.

One existing type of wheelchair for which the present invention is designed is a wheelchair or cart that has a seat that can be elevated or lowered with respect to a base having an appropriate number of wheels attached thereto to allow the wheelchair to move on the ground or other surface. In such existing wheelchairs, the seat height is typically adjusted by way of a telescoping mechanism that can be mechanically and/or electrically operated by the user.

Over the years, various mechanisms have been developed which allow the lifting of wheelchairs into a vehicle and their subsequent positioning in the vehicle. The existing mechanisms typically require motor-driven sources of power to lift or hoist the wheelchair from the ground and into the vehicle. Such mechanisms also typically require major modifications to the vehicle such as the addition of expensive, bulky and heavy equipment. Furthermore, the loading and unloading of wheelchairs into and out of such modified vehicles by existing mechanisms is time consuming, and sometimes requires an operator, other than the handicapped individual, to operate the lifting mechanism.

Thus, there is a need for a simple, light, inexpensive and easy-to-operate lifting apparatus and method for allowing a handicapped person to transfer his or her wheelchair (with the handicapped user seated thereon) into and out of a vehicle without assistance from others and without major or expensive modifications to a standard vehicle. The present invention fulfills these needs.

SUMMARY OF THE INVENTION

Briefly, and in general terms, the present invention is directed to a wheelchair and lifting apparatus which allows the wheelchair to be lifted into a vehicle by using the vehicle's door and the existing seat-height adjustment mechanism of the wheelchair to raise the wheelchair and its occupant from the ground level to the entry level of the vehicle, and for swinging the wheelchair into the vehicle. The wheelchair and lifting apparatus of the present invention also allows the wheelchair and its occupant to be swung out of the vehicle and lowered to the ground level in a reverse sequence of operations.

More specifically, a wheelchair and lifting apparatus in accordance with the present invention includes a wheelchair with means such as a pair of straps for attaching the wheelchair to the inside of the frame of a door of a vehicle. After attaching the wheelchair to the vehicle's door frame, the handicapped user of the wheelchair can activate the telescoping mechanism between the seat and the base so as to raise the base of the wheelchair (i.e., lower the seat height). Thus, by using the structure of the vehicle's door frame, the present invention enables the user to lift the wheelchair off the ground to a height such that the door of the vehicle can be closed. Upon closing of the vehicle door, the wheelchair swings into position inside the vehicle. Subsequently, the handicapped person can lower the base (i.e., raise the seat height) until the wheels rest on the floor of the vehicle, and then can detach the straps from the door frame. A cushion is provided between the inside of the vehicle door and the wheelchair, so that the wheelchair may rest against the cushion and be properly positioned inside the vehicle during swinging and upon the closing of the door.

The original driver's seat of the vehicle typically is removed and an armrest on the wheelchair preferably is used to attach the wheelchair to the inside of the driver's side door, so that when the wheelchair is hung from the driver's side door and the door is closed, the wheelchair is swung into the position of the driver's seat. Of course, other doors may be used for placing the wheelchair in other positions in the vehicle, and the wheelchair may be attached other than by an armrest.

A track is provided on the vehicle floor to receive and secure the wheelchair in the selected position. To allow the wheelchair, and thus the handicapped user, to move fore and aft relative to the automobile floor to achieve a convenient driving position, the track provides a plurality of selectable locked positions along the track. Accordingly, the handicapped user of the wheelchair of the present invention is provided with the ability to place the wheelchair in a convenient driving position. Of course, securing the wheelchair to the track prevents the wheelchair from moving or tipping over during movements of the vehicle.

With the present invention, the wheelchair user may get out of the car by reversing the procedure utilized to position the wheelchair inside the vehicle. For this purpose, the wheelchair is released from the track and the straps are attached to the door. Then, the telescoping mechanism is manipulated to raise the wheels off the floor, and the door of the vehicle is opened so that the wheelchair swings out of the vehicle. The telescoping mechanism then is activated to lower the base until the wheels of the wheelchair are on the ground. The user then may disconnect the straps from the door frame and move the wheelchair on the ground as desired.

These and other advantages of the invention will become more apparent from the following detailed description thereof, taken in conjunction with the accompanying exemplary drawings.

BRIEF DESCRIPTION OF THE DRAWINGS

FIG. 3 is a side view of the door of the vehicle shown in FIG. 1;

FIG. 4 is an edge elevational view of the door of the vehicle shown in FIG. 3;

FIG. 5 is an enlarged perspective view of a strap used to attach the wheelchair shown in FIG. 1 to the door of the vehicle;

FIG. 6 is an exploded view of a portion of a base of the wheelchair shown in FIG. 1 and a track mounted on the vehicle floor;

FIG. 7 is an enlarged cross-sectional view, taken along line 7—7 of FIG. 6; and

FIG. 8 is a cross-sectional view similar to FIG. 7 with parts in moved positions.

DETAILED DESCRIPTION OF THE PREFERRED EMBODIMENT

Figure 1:
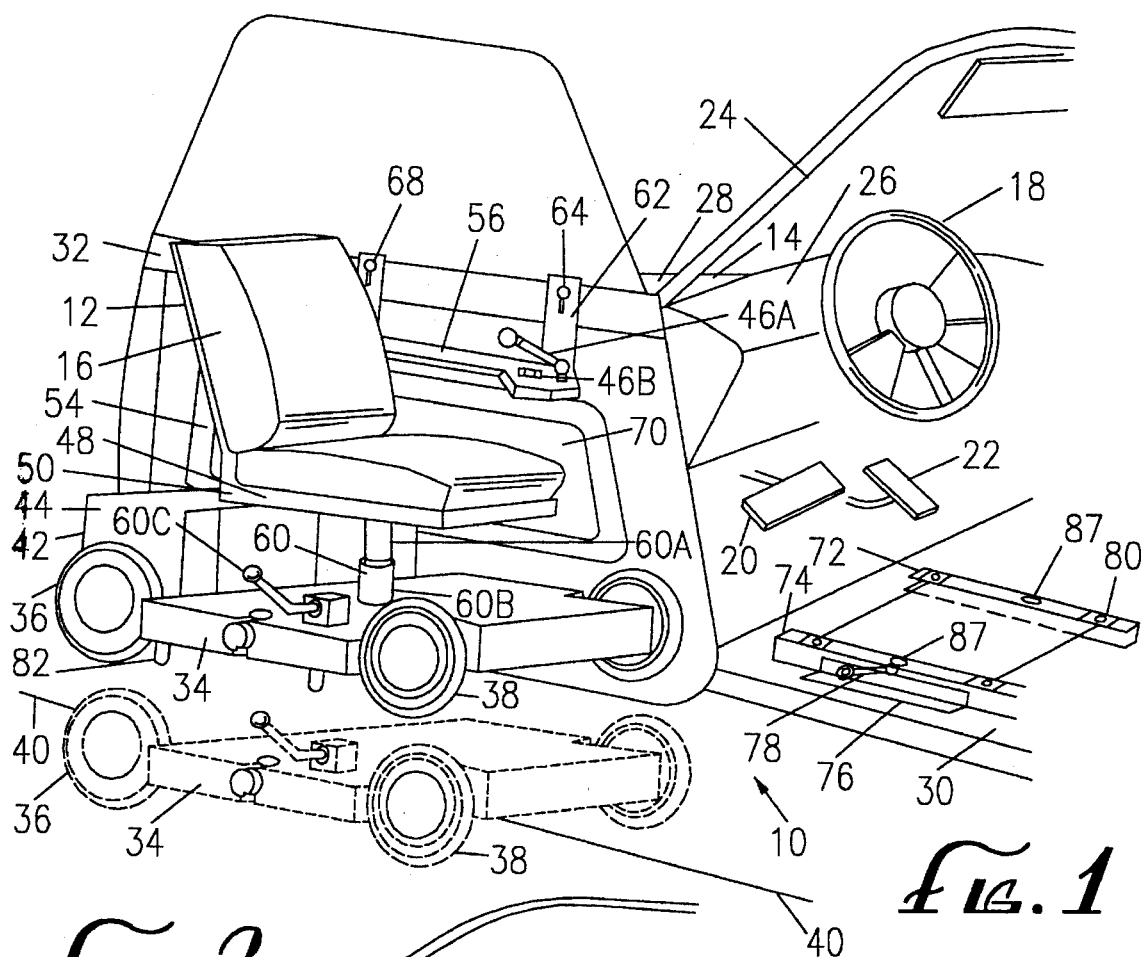
FIG. 1 is a fragmented schematic perspective view of a wheelchair and lifting apparatus embodying the present invention shown with parts of a vehicle, with the wheelchair shown attached to an open door of the vehicle and raised off the ground.

As shown in the drawings for purposes of illustration, the invention is incorporated in a wheelchair and lifting apparatus, indicated generally by the reference number 10, for use in loading a wheelchair 12 into a vehicle 14 while the wheelchair user, a disabled or handicapped person (not shown), is on the seat 16 of the wheelchair. In this instance, the invention is adapted to load the wheelchair and the occupant into the driver's position of the vehicle, behind a steering wheel 18 and brake and gas pedals 20 and 22, all of conventional types.

Figure 2:
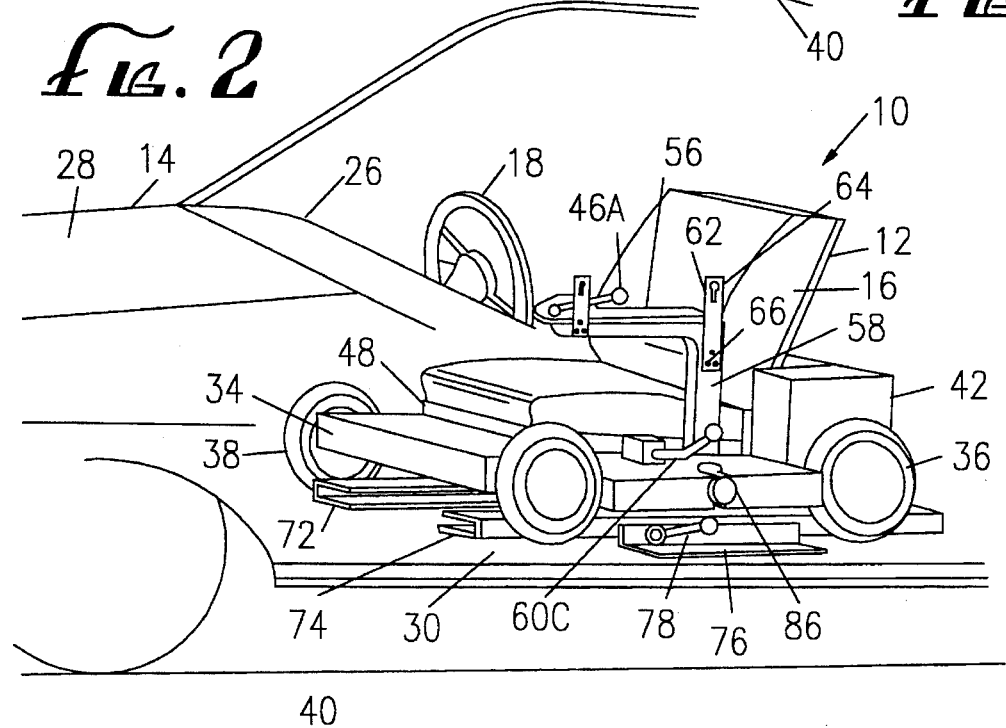
FIG. 2 is a schematic perspective view of the wheelchair and lifting apparatus shown in FIG. 1, with the wheelchair in position in the vehicle.

The illustrative vehicle 14 has a conventional windshield 24 and dashboard 26, and a body 28 including a floor 30 shown in part in FIGS. 1 and 2. A vehicle door 32 is hinged in the usual fashion on the body 28 to swing between an open position (FIG. 1) and a closed position alongside the driver's position. Only those parts of the vehicle that are necessary for an understanding of the invention are shown in the drawings, those parts being well known and conventional except as otherwise described herein.

The illustrative wheelchair 12 is of the type having a base 34 which herein is generally rectangular, a plurality of wheels 36 and 38, herein four, that are rotatably mounted on the base to rotate about axes that are horizontal when the wheelchair is in its normal operating condition with the wheels extending below the base to engage the ground, indicated at 40. An electric drive 42, including a battery pack 44, is mounted on the base and coupled to the rear wheels 36 to power the wheelchair, and at least one set of wheels is steerable in a conventional fashion by a joy-stick control 46a located on a control panel 46b.

As shown in FIGS. 1 and 2, the seat 16 of the wheelchair 12 is supported on the lower portion 48 of an L-shaped frame 50, and a back rest is mounted on the upright portion 54 of the frame. At least one armrest 56 is provided on the seat frame, herein on the side of the seat that is on the left side of the occupant of the wheelchair. As can be see in FIG. 2, this armrest is carried on the upper end of an upright post 58 that is secured at its lower end to the wheelchair base 34. The joy-stick control 46a is conveniently mounted on the forward end of the armrest, and the seat is supported on the base by an adjustable support mechanism 60 for varying the height of the seat 16 relative to the base.

In accordance with the present invention, the wheelchair and lifting apparatus 10 utilizes the adjustable support mechanism 60 for varying the height of the wheelchair seat 16 and the door 32 of the vehicle 14 as the only necessary elements for vertical and lateral movements of the wheelchair 12 during both loading and unloading of the wheelchair and its occupant into and out of the driver's position in the vehicle. This method greatly simplifies the loading/ unloading mechanism, and makes it possible for the occupant to perform all of the necessary loading and unloading operations while seated in the wheelchair.

For these purposes, the wheelchair 12 and the vehicle door 32 are joined together by connecting means, herein at least one vertical strap 62 and connections 64 and 66 joining the upper and lower ends of the strap, respectively to the door 32 and the wheelchair seat 16, for attaching the wheelchair securely to the door when the latter is open as shown in FIG. 1. For greater stability, two such straps 62 are used, spaced apart along the door, and preferably joined at their lower ends to the armrest 56 as by fasteners (FIG. 2) forming the lower connections 66. The upper connections 64 are formed by studs 68 projecting inwardly (i.e., toward the interior of the vehicle) from the door above the normal height of the wheelchair's armrest.

To fulfill the necessary lifting function, the adjustable support mechanism 60 comprises two telescoping support members 60a and 60b which are capable of extending and contracting the length of the member over a substantial stroke or throw at least as great as the amount of lifting required, and a power-driven, double-acting drive mechanism (not shown) which can be a double-acting hydraulic or pneumatic pump/cylinder mechanism, a reversible electric motor and screw mechanism, or other conventional drive mechanism and a control handle 60c for activating the mechanism. Only representative telescoping support members are shown herein since the drive mechanism can take various well known forms.

With this wheelchair and lifting apparatus, it is possible for the wheelchair occupant to drive to the side of the vehicle, open the driver-side door to the position shown in FIG. 1, and then maneuver the wheelchair to a position alongside the door, as indicated by the broken lines in FIG. 1 showing the base and the wheels of the wheelchair, with the armrest alongside the door. To accomplish the method of lifting and positioning of the wheelchair in accordance with the invention, the occupant can elevate the wheelchair seat to the level shown in FIG. 1, attach the straps 62 to the door studs 68, and then activate the adjustable support mechanism 60 to lower the seat relative to the wheelchair base 34. With the seat fixed to the door, this actually will raise the wheelchair base off the ground 40 while the seat remains stationary.

It will be seen in FIG. 1 that the wheels 36 and 38 of the raised wheelchair are at a level higher than the floor of the passenger compartment of the vehicle. This is accomplished by securing the wheelchair to the door at a relatively high level—herein by placing the studs on the door just below the window portion of the door, and providing the adjustable support mechanism 60 with a vertical stroke length sufficient to raise and lower the base between ground level and the raised level shown in FIG. 1 while the armrest and the seat are attached to the door by the straps 62.

Once the wheelchair has been raised off the ground to a level higher than the floor of the vehicle, the handicapped user can close the door to swing and move the wheelchair inside the vehicle in the driver's position. Then the user can activate the adjustable support mechanism 60 to lower the base of the wheelchair until the wheels reach the floor of the vehicle. With the wheelchair resting on the vehicle floor, the straps 62 may be removed from the door.

In another aspect of the invention and with reference to FIGS. 3 and 4, the inside of the door 32 of the vehicle 14 is provided with a cushion 70 which allows the wheelchair to rest against a relatively softer object when the wheelchair is hanging from the door during the lifting and lowering operations. The thickness and hardness/softness of the cushion can be selected to place the wheelchair in a desired position relative to the door of the vehicle for its subsequent positioning inside the vehicle. The cushion is preferably foam-filled so as to be economical, but air cushions which can be inflated upon demand by an air pump may alternatively be utilized.

In accordance with yet another aspect of the invention, the driver's position of the vehicle 14 is provided with an adjustable wheelchair mounting by which the wheelchair is secured in the driver's position and adjusted by the occupant for optimum positioning for driving. For this purpose, the mounting includes a pair of elongated rails 72 and 74 that are positioned on the vehicle floor in the driver's position to lie beneath the wheelchair, and locating means for acting between the rails and the wheelchair to secure the wheelchair to the rails, all in a quick and easy manner as the wheelchair is loaded into the vehicle.

The elongated rails 72 and 74 herein are bars of channel-shaped cross-section that are laid on the vehicle floor 30 between two laterally spaced anchor bars 76 that are secured to the floor (only one of the anchor bars is shown in FIGS. 1 and 2). The rails are locked in place on the anchor bars by a locking mechanism including at least one locking lever 78 that is operable by the occupant while sitting in the wheelchair. The details of the locking mechanism are not shown but can be similar to conventional mechanisms for adjusting the position of vehicle seats.

To locate the wheelchair 12 on the rails 72 and 74, at least one upwardly opening locating hole 80 is formed in each rail in a preselected position thereon to receive a downwardly projecting locating lug 82 on the underside of the wheelchair base over the rail. Herein, two such locating lugs and holes are provided for each rail, for firm locating engagement of the wheelchair with the rails 72 and 74. When the base and the wheels of the wheelchair are lowered onto the vehicle floor 30, each locating lug 82 enters its corresponding locating hole 80 in each rail. Each locating hole 80 has an enlarged, beveled upper end and a smaller lower end portion. The diameter of each locating lug 82 is smaller than the diameter of the lower end portion of the locating holes such that the locating lug may enter into the locating hole with a clearance fit.

In accordance with another aspect of the invention, after the locating lugs enter the locating holes in the rails, the base of the wheelchair is locked to the rails 72 and 74 by a locking means, herein two threaded lugs 84, each located on the base 34 that can be rotated by a handgrip 86 into the female threads of corresponding beveled anchor holes 87, each located in a preselected position in the rail. The base of the wheelchair is provided with a pair of slotted openings 88 to allow the threaded lugs to rotate as indicated by arrow 89 from a horizontal position as shown in FIG. 7 to a vertical position as shown in FIG. 8. During the lowering of the wheelchair's base onto the rails, each threaded lug is placed in its horizontal position, and after the locating lugs enter the locating holes, the user rotates each threaded lug to its vertical position as shown in FIG. 8 and tightens the threaded lug inside the beveled anchor hole. With the threaded lug at least partially threaded, an enlarged portion 90 of the threaded lug 84 fits into a circular portion 92 of the slotted opening 88 in the base so that the threaded lug may not move out of the slotted opening (FIG. 8). Further tightening of the threaded lugs 84 secures the base to the rails, and prevents the wheelchair from moving about in case of movements of the vehicle.

When the handicapped user is ready to exit the vehicle and move the wheelchair to the ground, the user performs the reverse method that placed the wheelchair inside the vehicle. Accordingly, the user first unscrews the threaded lug 84 and rotates it from its position as shown in FIG. 8 to the position shown in FIG. 7 so as to free the base from the rails. The user then adjusts the seat height by activating the control handle 60c of the adjustable height mechanism 60, positions the wheelchair so that the straps can be attached to the door studs 68, and attaches the straps 62 to the door. Next, the handicapped user activates the control handle 60c and raises the base and the wheels above the vehicle floor 30 so as to allow the wheels to clear the rails. Then the user can open the vehicle door, which simultaneously moves the wheelchair outside the vehicle to a position such as shown in FIG. 1. The control handle 60c is then used again to lower the base until the wheels of the wheelchair are on the ground. After detaching the straps from the door, the user may drive the wheelchair as desired on the ground.

From the foregoing, it will be appreciated that the wheelchair and lifting apparatus and method of the invention provides a convenient, inexpensive and easy way to allow a handicapped person to accomplish an unassisted transfer of his or her wheelchair to and from a vehicle while remaining on the wheelchair. The invention advantageously uses the swinging motion of the door of a vehicle and the height adjustment of the seat of the wheelchair to transfer a wheelchair to and from a vehicle with minor and inexpensive modifications to commonly available vehicles and wheelchairs, and thus, eliminates the need for hoists or moveable ramps or other cumbersome, bulky, expensive or heavy apparatus for moving wheelchairs into and out of vehicles.

While particular forms of the invention have been illustrated and described, it will be apparent that various modifications can be made to the present invention without departing from the spirit and scope thereof.

I claim as my invention:

1. In combination with a vehicle having a door hinged on the vehicle for swinging between open and closed positions and having a driver's position inside the vehicle alongside the closed position of said door, a wheelchair and lifting apparatus for loading said wheelchair and an occupant into the vehicle, comprising:

a wheelchair having a base, wheels rotatably mounted on said base, a seat for holding the occupant, and a seat-height adjustment mechanism for raising and lowering said seat and the occupant relative to said base;

means for securing said wheelchair to said door when the latter is in said open position and the wheelchair is alongside the door and outside of the vehicle;

said seat-height adjustment mechanism being operable to raise said seat relative to said base to a predetermined height for attachment to said door, and also being operable to raise said base relative to said seat, while the wheelchair is attached to the door, to a height enabling the wheelchair to enter the vehicle as the door is closed, whereby the closing of the door will swing the wheelchair into the driver's position in the vehicle;

and means in the vehicle for locating and securing said wheelchair in the driver's position for operation of the vehicle by the occupant of the wheelchair.

2. The combination defined in claim 1 wherein said seat-height adjustment mechanism comprises at least two telescoping members between said base and said seat.

3. The combination defined in claim 1 wherein said means for securing said wheelchair to said door include an armrest on one side of said seat, fasteners on said door, and means for connecting said armrest to said fasteners.

4. The combination defined in claim 3 wherein said means for connecting said armrest to said fasteners comprise at least one elongated strap having one end fastened to said armrest and an opposite end configured for releasable engagement with said fasteners.

5. The combination defined in claim 1 wherein said means for locating and securing said wheelchair in said driver's position comprise a pair of elongated rails adjustably secured to the vehicle floor in said driver's position, and at least one set of interfitting locating abutments between said wheelchair and each of said rails.

6. The combination defined in claim 5 wherein each set of said locating abutments comprises an upwardly opening hole in the rail having an enlarged, beveled upper end and a smaller lower end portion, and a downwardly projecting lug on the underside of said base, said lug being smaller than said beveled upper end for entry into said hole with a clearance fit and sized to fit closely into said lower end portion for secure locating of the wheelchair on the rail.

7. The combination defined in claim 5 wherein said means for locating and securing said wheelchair in said driver's position comprises at least one upwardly opening threaded anchor hole in at least one of said rails, and at least one threaded lug located on said base, said threaded lug sized to fit in a threaded engagement inside said threaded anchor hole.

8. The combination defined in claim 7 wherein said threaded lug may rotate between a first position and a second position in a slotted opening in said base, said first position being aligned with the upwardly opening threaded anchor hole and said second position being perpendicular to the upwardly opening threaded anchor hole.

9. A wheelchair and lifting apparatus for use in combination with a vehicle for loading said wheelchair and a wheelchair occupant into said vehicle, comprising:
    a door hinged on the vehicle for swinging between open and closed positions;
    said vehicle having a wheelchair position inside the vehicle alongside the closed position of said door;
    said wheelchair having a base, a plurality of wheels rotatably mounted on said base, a seat for holding the occupant, and a seat-height adjustment mechanism for raising and lowering said seat and the occupant relative to said base;
    means for securing said wheelchair to said door when the latter is in said open position and the wheelchair is alongside the door and outside of the vehicle; and
    said seat-height adjustment mechanism being operable to raise said seat relative to said base to a predetermined height for attachment to said door, and also being operable to raise said base relative to said seat, while the seat is attached to the door, to a height enabling the wheelchair to enter the vehicle as the door is closed, whereby the closing of the door will swing the wheelchair into the wheelchair position in the vehicle.

10. A method of loading a wheelchair and an occupant thereon into and out of a vehicle having a floor and a door that is hinged for swinging between open and closed positions, comprising the steps of:
    providing a wheelchair having a base with wheels, a seat and a seat-height adjustment mechanism for raising and lowering the seat relative to the base between a lowest and a highest position;
    positioning the wheelchair alongside the door while the latter is in said open position;
    elevating the seat with the seat-height adjustment mechanism to a level above its lowest position, and securing the wheelchair to the door;
    raising the base relative to the seat with the seat-height adjustment mechanism to a level high enough to enable swinging of the base and said wheels into the vehicle;
    swinging the door into said closed position with the wheelchair having the occupant thereon secured to said door; and
    lowering the base onto the floor of the vehicle with the seat-height adjustment mechanism.

11. The method as defined in claim 10 wherein the positioning, elevating, raising and lowering steps are performed by the occupant while sitting in the seat.

12. A wheelchair and lifting apparatus for use in combination with a vehicle having a door for supporting and positioning the wheelchair and an occupant of the wheelchair in the vehicle, comprising:
    a wheelchair having a seat for supporting the occupant;
    said wheelchair having a base and wheels mounted on said base;
    a height adjustment mechanism between said seat and said base for lowering and raising the height of said seat relative to said base; and
    means for securing said wheelchair to said door in an open position such that said base and said wheels of said wheelchair, can be raised relative to said seat to a height enabling the wheelchair to enter the vehicle upon closing of the door of the vehicle.

13. The wheelchair of claim 12 wherein said means for securing said wheelchair to said door comprises an armrest and at least one strap for attachment between said armrest and said door.

14. A method of loading a wheelchair and its occupant into a vehicle having a door and a floor wherein the wheelchair includes a seat for supporting the occupant, a base and a plurality of wheels mounted on said base, a height adjustment mechanism between said seat and said base to raise or lower the seat relative to said base, means for securing said wheelchair to the door of the vehicle such that said wheelchair can be hung from said door, said method comprising the steps of:
    opening the door of the vehicle;
    positioning said wheelchair alongside of said open door;
    connecting said securing means between said wheelchair and said open door;
    operating said height adjustment mechanism to raise said base and wheels of said wheelchair relative to said seat to a height above the floor of the vehicle; and
    closing the door of the vehicle to move said wheelchair inside the vehicle.

15. The method of claim 14, further comprising the step of operating said height adjustment mechanism to lower said base and wheels onto the floor of the vehicle.

* * * * *